(12) United States Patent
Hattori et al.

(10) Patent No.: US 12,429,068 B2
(45) Date of Patent: Sep. 30, 2025

(54) ELECTRIC PUMP

(71) Applicant: AISIN CORPORATION, Aichi (JP)

(72) Inventors: Shuji Hattori, Kariya (JP); Yuta Inoue, Kariya (JP); Tomohiro Kajita, Kariya (JP)

(73) Assignee: AISIN CORPORATION, Aichi (JP)

( * ) Notice: Subject to any disclaimer, the term of this patent is extended or adjusted under 35 U.S.C. 154(b) by 0 days.

(21) Appl. No.: 18/840,782

(22) PCT Filed: Jan. 30, 2023

(86) PCT No.: PCT/JP2023/002810
§ 371 (c)(1),
(2) Date: Aug. 22, 2024

(87) PCT Pub. No.: WO2023/195213
PCT Pub. Date: Oct. 12, 2023

(65) Prior Publication Data
US 2025/0163938 A1    May 22, 2025

(30) Foreign Application Priority Data

Apr. 4, 2022    (JP) .................. 2022-062594

(51) Int. Cl.
*F04D 29/66* (2006.01)
*F04D 29/42* (2006.01)
(Continued)

(52) U.S. Cl.
CPC ......... *F04D 29/669* (2013.01); *F04D 29/426* (2013.01); *F04D 29/605* (2013.01); *F04D 29/628* (2013.01)

(58) Field of Classification Search
CPC .............................. F04D 29/669; F04D 29/605
See application file for complete search history.

(56) References Cited

U.S. PATENT DOCUMENTS

| | | | |
|---|---|---|---|
| 6,424,066 B1 * | 7/2002 | Watson | F16C 27/02 |
| | | | 310/90 |
| 2013/0083451 A1 | 4/2013 | Wetherill | |
| 2018/0087533 A1 * | 3/2018 | Mochizuki | F04D 29/669 |

FOREIGN PATENT DOCUMENTS

| | | | | |
|---|---|---|---|---|
| DE | 102016201560 A1 * | 8/2017 | | B60R 11/00 |
| GB | 2356227 A * | 5/2001 | | F04D 13/10 |

(Continued)

OTHER PUBLICATIONS

Translation DE-102016201560-A1 (Year: 2025).*
(Continued)

*Primary Examiner* — J. Todd Newton
(74) *Attorney, Agent, or Firm* — BUCHANAN INGERSOLL & ROONEY PC

(57) ABSTRACT

An electric pump includes a pump body, an annular elastic member to be arranged on an outer periphery of the pump body, and a lock member to be attached to the elastic member. The elastic member is split as a part of a peripheral direction, and includes a pair of penetration holes along an axial direction of the elastic member, at both end portions that faces each other by the splitting of the peripheral direction. The lock member is inserted into the pair of penetration holes in such a way that the elastic member closely contacts with the pump body and holds the pump body.

10 Claims, 7 Drawing Sheets

(51) Int. Cl.
    *F04D 29/60*         (2006.01)
    *F04D 29/62*         (2006.01)

(56) References Cited

FOREIGN PATENT DOCUMENTS

| | | |
|---|---|---|
| JP | 2008121522 A | 5/2008 |
| JP | 2014533341 A | 12/2014 |
| JP | 2018053756 A | 4/2018 |
| JP | 2021139376 A | 9/2021 |

OTHER PUBLICATIONS

International Search Report (PCT/ISA/210) with translation and Written Opinion (PCT/ISA/237) mailed Apr. 11, 2023, by the Japan Patent Office as the International Searching Authority for International Application No. PCT/JP2023/002810. (10 pages).

* cited by examiner

ELECTRIC PUMP

TECHNICAL FIELD

The present disclosure relates to an electric pump that includes an elastic member holding a pump body.

BACKGROUND ART

Vehicles use electric pumps that circulate cooling water or the like. When such an electric pump is installed in the vehicle, vibration of the electric pump needs to be suppressed from being transmitted to the vehicle in order to maintain silence of the vehicle at a time of driving. Further, vibration needs to be suppressed from being transmitted to the electric pump from an outside in order to stably operate the electric pump.

Patent Literatures 1 and 2 disclose a configuration in which an annular elastic member is attached to a pump body of an electric pump in order to suppress vibration. Patent Literature 3 discloses a configuration in which a plate-shaped elastic member is wound around a pump body of an electric pump, and both ends of the elastic member engage with protrusions provided on a side of the pump. Patent Literature 4 discloses a configuration in which an annular elastic member formed with including a gap in a part in a peripheral direction is arranged at a pump body of an electric pump, and the annular elastic member is tightened in the peripheral direction and thereby fixed to the pump body. Specifically, in the configuration described in Patent Literature 4, the annular elastic member includes both ends that sandwich the gap and that are provided with a pair of fastening portions protruding outward in a radial direction, and an annular ring is fitted onto a pair of the fastening portions along the radial direction, thereby the annular elastic member is tightened and fixed to the pump body.

CITATION LIST

Patent Literature

Patent Literature 1: JP2014-533341A
Patent Literature 2: JP2008-121522A
Patent Literature 3: JP2018-53756A
Patent Literature 4: JP2021-139376A

SUMMARY

Technical Problem

In the configuration described in Patent Literatures 1 and 2, when the annular elastic member is fitted onto and attached to the pump body of the electric pump, the elastic member needs to be stretched. However, there is a possibility that stretching the elastic member to a large extent causes a problem such as permanent deformation. Meanwhile, when a stretching amount of the elastic member is set small, a possibility of occurrence of the above-mentioned problem in the elastic member becomes low, but there is a possibility of decrease in workability at a time of attaching the annular elastic member to the pump body, and there is a possibility that a fixed state after attachment to the pump body becomes insufficient.

In the configuration described in Patent Literature 3, the plate-shaped elastic member wound around the pump body of the electric pump is held by engaging with the protrusions on an outer peripheral surface of the pump body, and for this reason, when engagement force between the protrusions of the pump body and the plate-shaped elastic member is not sufficient, there is a possibility that the elastic member separates from the protrusions of the pump body due to vibration from the pump body or an outside, and thus, the elastic member cannot stably hold the pump body. In the configuration described in Patent Literature 4, the annular ring is fitted along the radial direction, and for this reason, large fastening portions need to be formed by causing the fastening portions to extend, to a large extent, outward in the radial direction of the annular elastic member, in order to stably hold the elastic member. Thereby, the electric pump to which the elastic member is attached is increased in size, and mountability to a vehicle deteriorates. Since the fastening portions are located on an outer side of the annular elastic member in the radial direction, the annular elastic member is insufficiently tightened to the pump body, and there is a possibility that force of holding the pump body by the annular elastic member becomes small.

In view of the above, there is a need for an electric pump that includes an elastic member having satisfactory attachability and has satisfactory mountability to a vehicle or the like while vibration is appropriately suppressed.

Solution to Problem

A feature configuration of an electric pump according to the present disclosure includes: a pump body; an annular elastic member to be arranged at an outer periphery of the pump body; and a lock member to be attached to the elastic member, wherein the elastic member is split as a part of a peripheral direction, and includes a pair of penetration holes along an axial direction of the elastic member, at both end portions that face each other by the splitting in the peripheral direction, and the lock member is inserted into a pair of the penetration holes in such a way that the elastic member closely contacts with the pump body and holds the pump body.

According to the present configuration, the electric pump includes the annular elastic member that is arranged at the outer periphery of the pump body and that is split as a part of the peripheral direction, and the lock member is inserted into a pair of the penetration holes formed along the axial direction at both end portions of the elastic member. Thereby, in the electric pump, the annular elastic member is attached in a state of closely contacting with the pump body, and can stably hold the pump body.

A lock member for holding the annular elastic member at the outer periphery of the pump body is needed in order that the annular elastic member including the split part in the peripheral direction is attached to the outer periphery of the pump body. Herein, arranging the lock member along a radial direction of the annular elastic member needs measures such as a configuration in which fastening portions protrude outward in the radial direction of the annular elastic member, and a configuration in which the lock member is constituted of two members, for example, a bolt and a nut, and thus, the electric pump is increased in size. Meanwhile, as in the present configuration, a pair of penetration holes along the axial direction are provided in the annular elastic member, and the lock member is inserted into a pair of the penetration holes, thereby the lock member does not largely protrude in the radial direction because of being inserted along the axial direction, even when the lock member is increased in size for causing the elastic member to stably hold the pump body. In other words, the annular elastic member does not need to be provided with the fastening portions protruding outward in the radial direction, and can be configured compactly. As a result, the electric pump held by the elastic member improves mountability to a vehicle or the like.

Another feature configuration of the electric pump may be that the lock member has a U-shape that includes a pair of holding portions extending in the axial direction and a connection portion connecting a pair of the holding portions to each other, and a pair of the holding portions are inserted into a pair of the penetration holes.

According to the present configuration, the lock member has a simple U-shaped configuration including a pair of the holding portions and the connection portion that connects a pair of the holding portions to each other, and thus, the lock member can be easily manufactured. Since a pair of the holding portions in the lock member extend in the axial direction, a pair of the holding portions can be easily inserted into a pair of the penetration holes of the elastic member. Thereby, the elastic member in the electric pump has more improved attachability.

Another feature configuration of the electric pump may be that the annular elastic member includes a notch portion formed inward in a radial direction in an area that is included in an area between a pair of the penetration holes in the peripheral direction and that ranges along the axial direction from a side of an extension end of the holding portion to an intermediate location, and a part of the lock member is visible from an outside via the notch portion.

In order for the lock member to stably attach the annular elastic member to the pump body, a pair of the holding portions may be inserted into a pair of the penetration holes in the axial direction, over a length equal to or larger than a half length of the elastic member along the axial direction, for example. However, since a pair of the holding portions of the lock member are inserted into a pair of the penetration holes, usually, a state of insertion of a pair of the holding portions into a pair of the penetration holes cannot be confirmed from outside of the annular elastic member unless a length of the holding portion is longer than a length of the elastic member along the axial direction. In view of the above, according to the present configuration, the annular elastic member includes a notch portion formed inward in the radial direction in an area that is included in an area between a pair of the penetration holes in the peripheral direction and that ranges along the axial direction from a side of the extension end of the holding portion to an intermediate location, and thus, the annular elastic member is configured in such a way that a part of the lock member is visible from an outside via the notch portion. Thereby, the notch portion enables easy confirmation of whether positions of a pair of the holding portions of the lock member are appropriate, and the lock member can be reliably arranged and attached at an appropriate position in the annular elastic member by adjusting a position of the lock member, based on a result of the confirmation.

Another feature configuration of the electric pump may be that the pump body includes a pair of protrusions protruding outward in a radial direction at positions that are on an outer peripheral surface of the pump body and that face the both end portions of the elastic member, the elastic member includes a pair of recesses with which a pair of the protrusions engage, and a distance between a pair of the recesses in the peripheral direction is shorter than a distance between a pair of the penetration holes in the peripheral direction.

In a peripheral direction of continuing to a pair of the penetration holes, the lock member inserted into a pair of the penetration holes elastically deforms the annular elastic member in a direction in which both end portions become closer to each other. However, elastic deformation less occurs by the lock member at parts in the annular elastic member and on an inner peripheral side closer to the pump body than a pair of the penetration holes, and the parts on the inner peripheral side receive reaction force in a direction in which both end portions of the annular elastic member are separated from each other and are thereby caused to be in an opened state in some cases. In view of the above, in the present configuration, the pump body includes a pair of protrusions protruding outward in the radial direction at positions that are on an outer peripheral surface of the pump body and that face both end portions of the elastic member, the elastic member includes a pair of recesses with which a pair of the protrusions engage, and a distance between a pair of the recesses in the peripheral direction is shorter than a distance between a pair of the penetration holes in the peripheral direction. Thereby, in the annular elastic member, reaction force in a direction in which both end portions are separated from each other can be received by a pair of the protrusions included in the pump body and engaging with a pair of the recesses. As a result, the annular elastic member can suppress the parts on an inner peripheral side of a pair of the penetration holes from being opened. A pair of the recesses of the elastic member are caused to engage with a pair of the protrusions of the pump body, and thus, the elastic member is easily positioned relative to the pump body, and the elastic member is temporarily locked to the pump body, thereby the electric pump allows the elastic member to be quickly arranged on the outer periphery of the pump body.

Another feature configuration of the electric pump may be that each of a pair of the penetration holes includes an escape portion that is located on a side closer to an opposite penetration hole in the peripheral direction of the elastic member and that expands inward and outward in a radial direction.

In the electric pump, the lock member to be inserted into a pair of the penetration holes of the elastic member can be produced by pressing a metal material or the like, for example. In this case, burrs occur on an end portion of the lock member on a side of a sag surface in some cases. Existence of the burrs on the end portion of the lock member hinders the lock member from being inserted into a pair of the penetration holes. There is a possibility that the burrs cause cracks in the penetration holes, thus leading to rupture of the elastic member. For this reason, in order to prevent the burrs from coming into contact against the penetration holes, processing of removing the burrs is needed in producing the lock member. However, removing the burrs needs a work step. In view of the above, in the present configuration, each of a pair of the penetration holes in the elastic member includes the escape portion that is located on a side closer to the opposite penetration hole in the peripheral direction of the elastic member and that expands inward and outward in the radial direction. Thereby, even when the burrs exist on the lock member, the escape portion formed in a pair of the penetration holes allows the burrs on the lock member, and can prevent the burrs from coming into contact against the penetration holes. As a result, processing of removing the burrs is not needed, and thus, the lock member can be easily produced. The escape portion is formed both on a radial-direction inner side and on a radial-direction outer side in a pair of the penetration holes, and thus, the pressed lock member can be attached without distinguishing whether the sag surface is on a front side or on a back side.

Another feature configuration of the electric pump may be that the annular elastic member is configured in such a way that the both end portions can be locked by each other in the peripheral direction.

According to the present configuration, the annular elastic member is configured in such a way as to include both end portions that can be locked by each other in the peripheral direction, and thus, both end portions of the annular elastic member are not separated from each other even when both end portions of the annular elastic member receive reaction force in a direction of opening the annular elastic member. For this reason, the annular elastic member can be easily made to closely contact with the pump body. Both end portions of the elastic member are locked by each other in the peripheral direction, and thus, the elastic member can be temporarily locked to the pump body. Thereby, the electric pump allows the elastic member to be quickly arranged on the outer periphery of the pump body.

Another feature configuration of the electric pump may be that the elastic member includes an annular portion including the both end portions, and an extension portion connected to the annular portion, the pump body includes a cylindrical portion with which the annular portion closely contacts, and the extension portion extends from a part of an outer periphery of the annular portion, outward in a radial direction of the cylindrical portion, and an opening is formed in the extension portion.

According to the present configuration, in the electric pump, the annular portion of the elastic member closely contacts with the cylindrical portion of the pump body, and thus, the pump body can be reliably held by the elastic member. A bracket for example is inserted into the opening formed in the extension portion connected to the annular portion, and thus, the electric pump is easily held by the bracket.

Another feature configuration of the electric pump may be that the elastic member includes an annular portion including the both end portions, the pump body includes a cylindrical portion with which the annular portion closely contacts, and the annular portion is formed in such a way that the both end portions protrude outward in a radial direction of the cylindrical portion.

According to the present configuration, in the electric pump, the annular portion of the elastic member closely contacts with the cylindrical portion of the pump body, and thus, the pump body can be reliably held by the elastic member. In the electric pump, both end portions of the annular portion are formed in such a way as to protrude outward in the radial direction of the cylindrical portion of the pump body, and thus, for example, forming wide penetration holes in both end portions of the annular portion enables the lock member to be easily inserted into the penetration holes.

Another feature configuration of the electric pump may be that the elastic member includes an annular portion including both end portions, the pump body includes a cylindrical portion with which the annular portion closely contacts, the cylindrical portion includes a pair of protrusions protruding outward in a radial direction at positions that are on an outer peripheral surface of the cylindrical portion and that face the both end portions of the annular portion, the annular portion includes a pair of recesses with which a pair of the protrusions engage, and is arranged in such a way as to be along the cylindrical portion of the pump body, and a pair of the recesses engage with a pair of the protrusions.

According to the present configuration, in the electric pump, the annular portion of the elastic member closely contacts with the cylindrical portion of the pump body, and thus, the pump body can be reliably held by the elastic member. The annular portion of the elastic member can receive reaction force in a direction in which both end portions are separated from each other, by a pair of the protrusions included in the cylindrical portion of the pump body and engaging with a pair of the recesses. As a result, the annular portion of the elastic member can suppress a part located on an inner peripheral side of a pair of the penetration holes from being opened. Engaging a pair of the protrusions on the cylindrical portion of the pump body with a pair of the recesses on the annular portion allows the annular portion to be easily positioned relative to the cylindrical portion, and results in that the annular portion is temporarily locked to the cylindrical portion of the pump body, thereby the electric pump enables the elastic member to be quickly arranged on the outer periphery of the pump body.

Another feature configuration of the electric pump may be that the elastic member includes an annular portion, the pump body includes a cylindrical portion with which the annular portion closely contacts, and a pair of flanges that are provided at both end portions in the cylindrical portion in the axial direction of the annular portion, and a pair of the flanges are provided in such a way as to be able to restrict movement of the annular portion in the axial direction.

According to the present configuration, in the electric pump, the annular portion of the elastic member closely contacts with the cylindrical portion of the pump body, and thus, the pump body can be reliably held by the elastic member. A pair of the flanges provided at the cylindrical portion of the pump body can prevent a problem that the annular portion of the elastic member moves in the axial direction of the cylindrical portion and is detached from the pump body. As a result, the electric pump allows the elastic member to be more reliably held on the pump body.

DESCRIPTION OF EMBODIMENTS

Hereinafter, embodiments of the present disclosure are described with reference to the drawings. An electric pump according to the present disclosure is provided at a cooling water supply system in an automobile, for example. However, application of the electric pump is not limited to automobiles, and the electric pump may be used for supplying fluid other than cooling water.

First Embodiment

Figure 1:
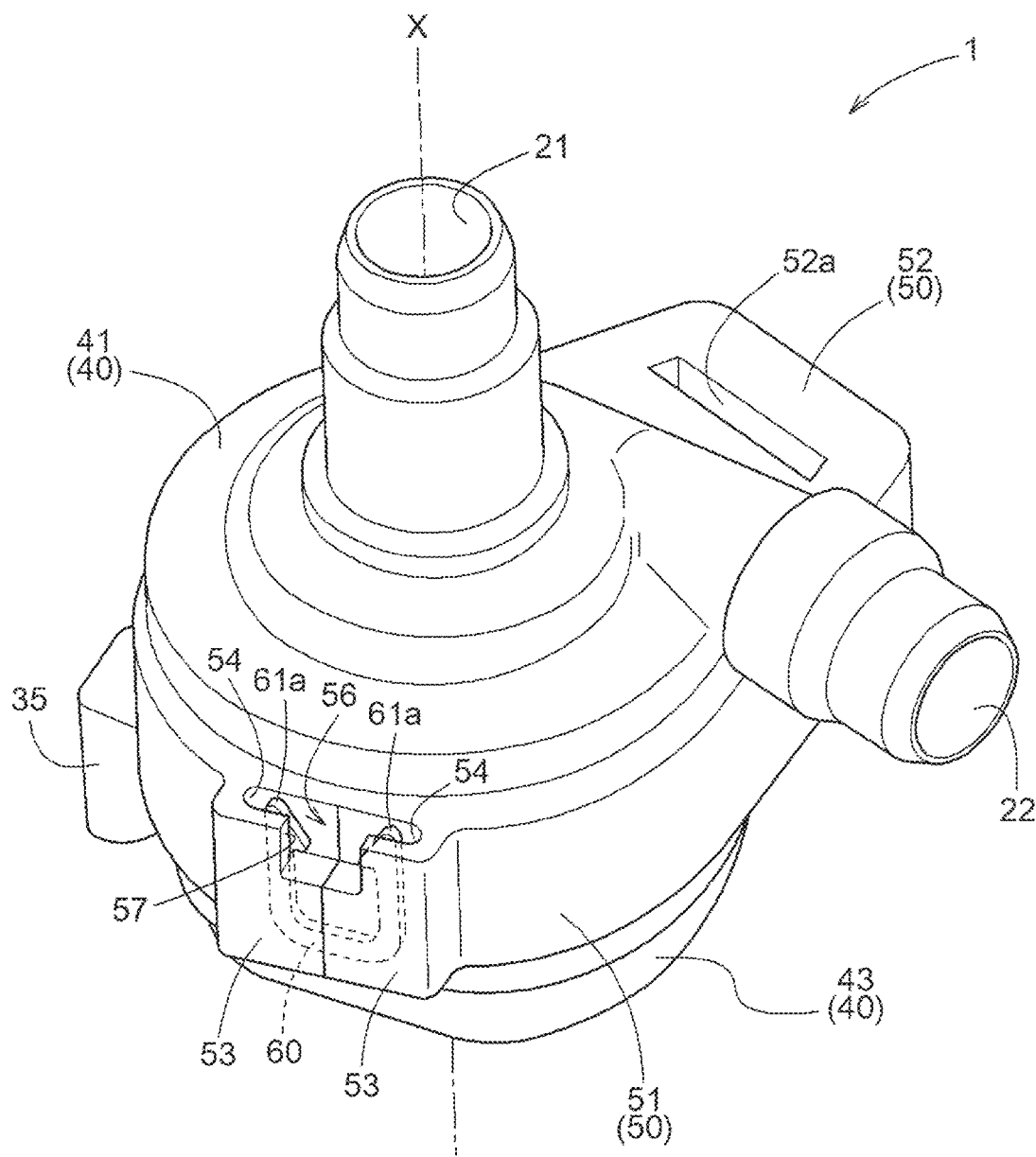
FIG. 1 is a perspective view of an electric pump.
Figure 2:
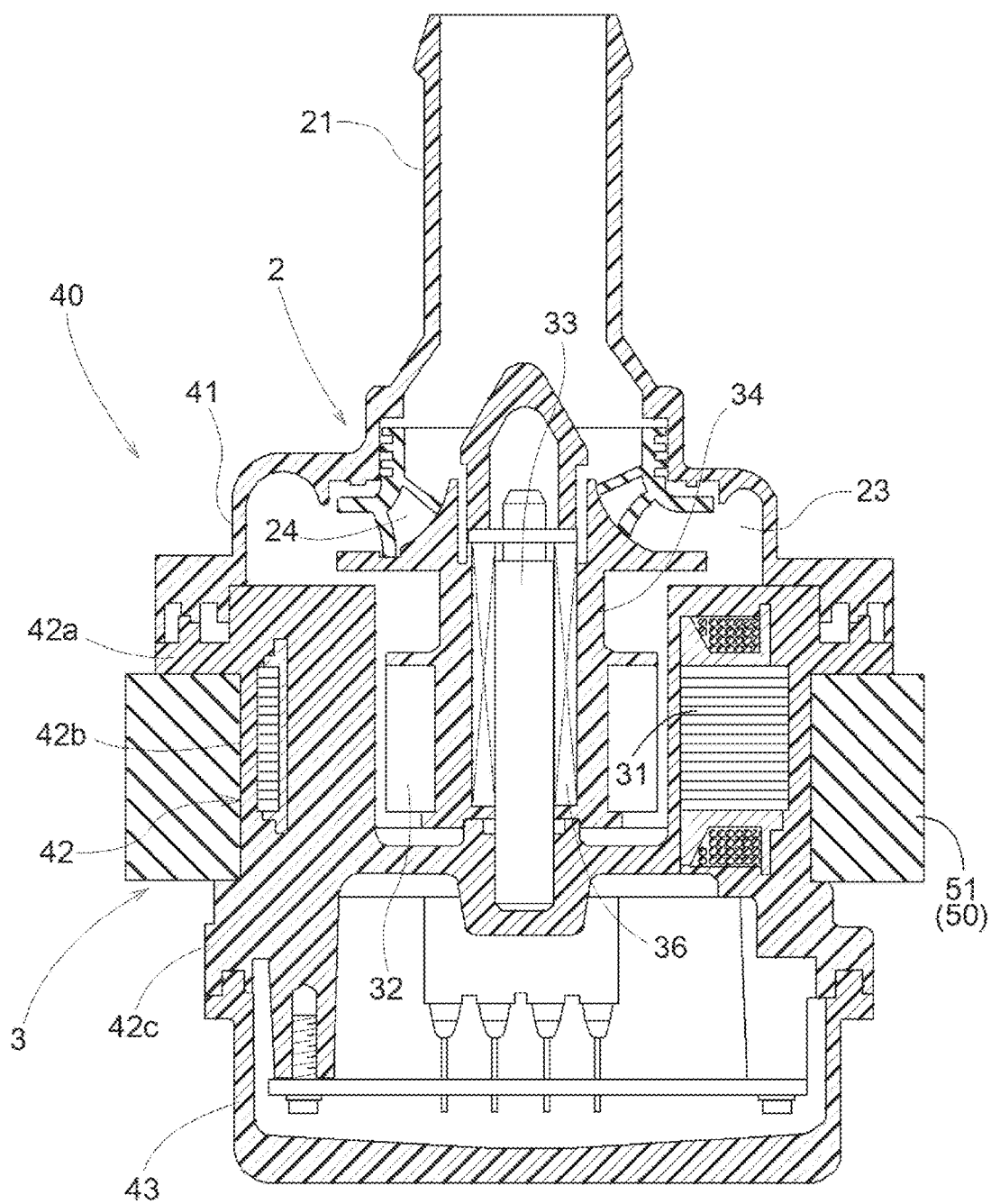
FIG. 2 is an axial-direction sectional view of a pump body.

As illustrated in FIG. 1 to FIG. 7, the electric pump 1 includes a pump unit 2, a motor 3 that drives the pump unit 2, a pump body 40 that accommodates the pump unit 2 and the motor 3, an elastic member 50 that is provided around the pump body 40, and a lock member 60 that is attached to the elastic member 50. As illustrated in FIG. 2, the pump body 40 is configured by coupling a pump housing 41 accommodating the pump unit 2, to a motor body 42 accommodating the motor 3.

As illustrated in FIG. 1, a cylindrical suction port 21 and a cylindrical discharge port 22 are formed in the pump housing 41. The suction port 21 and the discharge port 22 each communicate with an impeller chamber 23 (refer to FIG. 2) formed inside the pump housing 41. The impeller chamber 23 accommodates an impeller 24. When the impeller 24 rotates, fluid is sucked into the impeller chamber 23 through the suction port 21, and is discharged from the impeller chamber 23 to the discharge port 22.

As illustrated in FIG. 2, a stator 31 is provided integrally with and inside the motor body 42 by insert molding. A rotor 32 in which magnets are incorporated is provided on a radial-direction inner side of the stator 31 while a gap exists between the rotor 32 and the stator 31 in the radial direction. A rotational shaft 33 includes an end portion embedded in the motor body 42, and is configured to be non-rotatable relative to the motor body 42. A rotational member 34 is arranged on an outer peripheral side of the rotational shaft 33 via a bearing member 36, and is provided rotatably around the rotational shaft 33. The rotor 32 into which the unillustrated magnets are inserted is arranged at one end portion of the rotational member 34, and the impeller 24 is formed at an opposite end portion of the rotational member 34. According to the present configuration, the rotor 32 rotates by magnetic force generated between the rotor 32 and the stator 31, and the rotational member 34 and the impeller 24 rotate integrally with the rotor 32.

The pump body 40 includes a driver case 43 that accommodates a driver controlling the motor 3. The driver case 43 is provided to be coupled to the motor body 42, and the driver case 43 and the pump housing 41 are located on both sides of the motor body 42 in such a way that the motor body 42 is sandwiched between the driver case 43 and the pump housing 41. The motor body 42 is provided with a connector 35 for connecting the motor 3 to an electric power supply and a control system.

Figure 3:
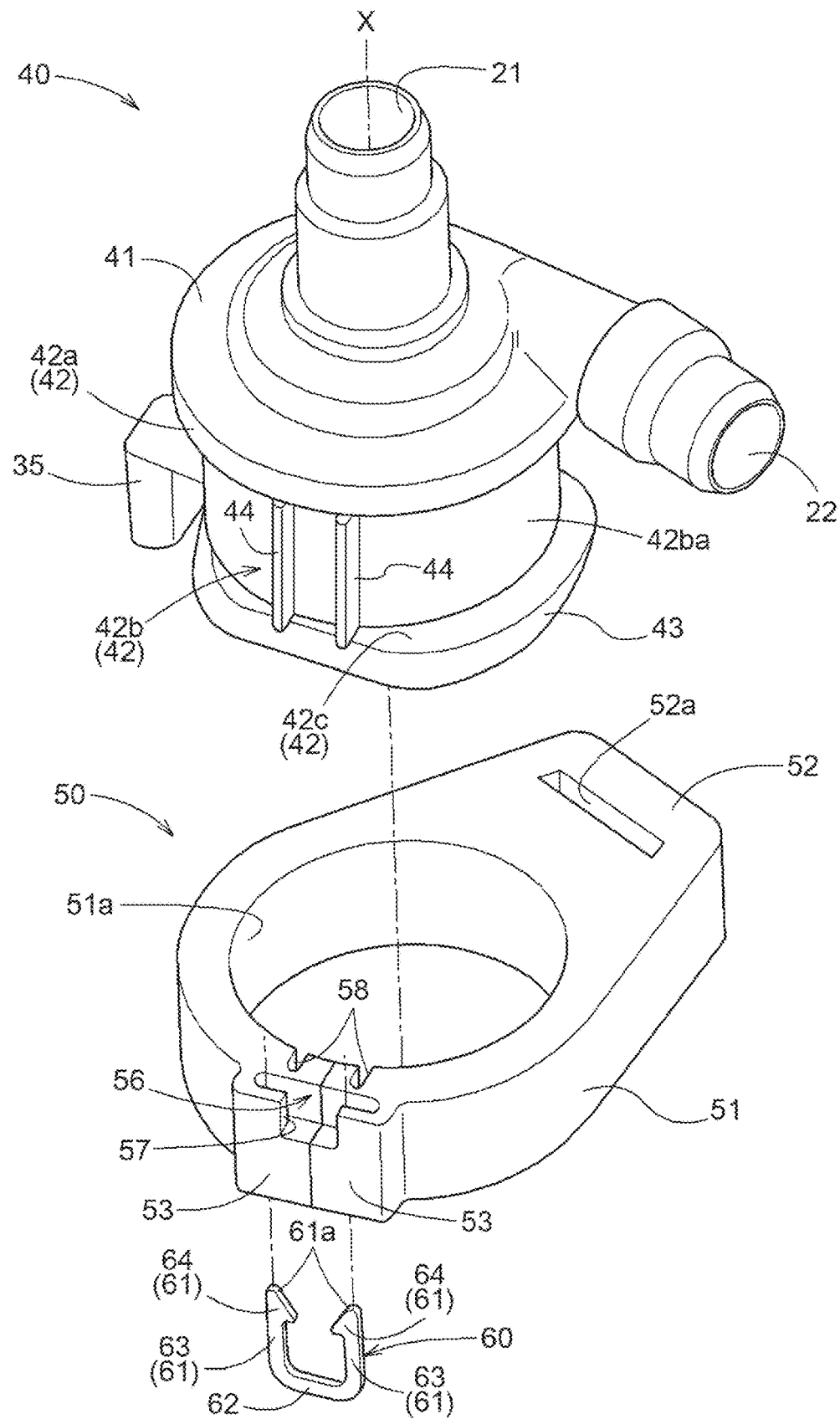
FIG. 3 is an exploded perspective view of the electric pump.

As illustrated in FIG. 3, the motor body 42 is generally cylindrical, and includes a flange 42a at an end portion on a side of the pump housing 41 and a flange 42c at an end portion on a side of the driver case 43. The driver case 43 is provided in a cover shape for the motor body 42. Thus, the pump body 40 includes a cylindrical portion 42b at which an annular portion 51 of the below-described elastic member 50 is arranged, and a pair of the flanges 42a and 42c provided on both end sides in the annular portion 51 in a direction of the axis X of the cylindrical portion 42b, and a pair of the flanges 42a and 42c are arranged in such a way as to be able to restrict movement of the annular portion 51 in the direction of the axis X. Thereby, a pair of the flanges 42a and 42c of the electric pump 1 can prevent a problem that the annular portion 51 of the below-described elastic member 50 moves in the axial direction of the cylindrical portion 42b and is detached from the pump body 40.

Figure 4:
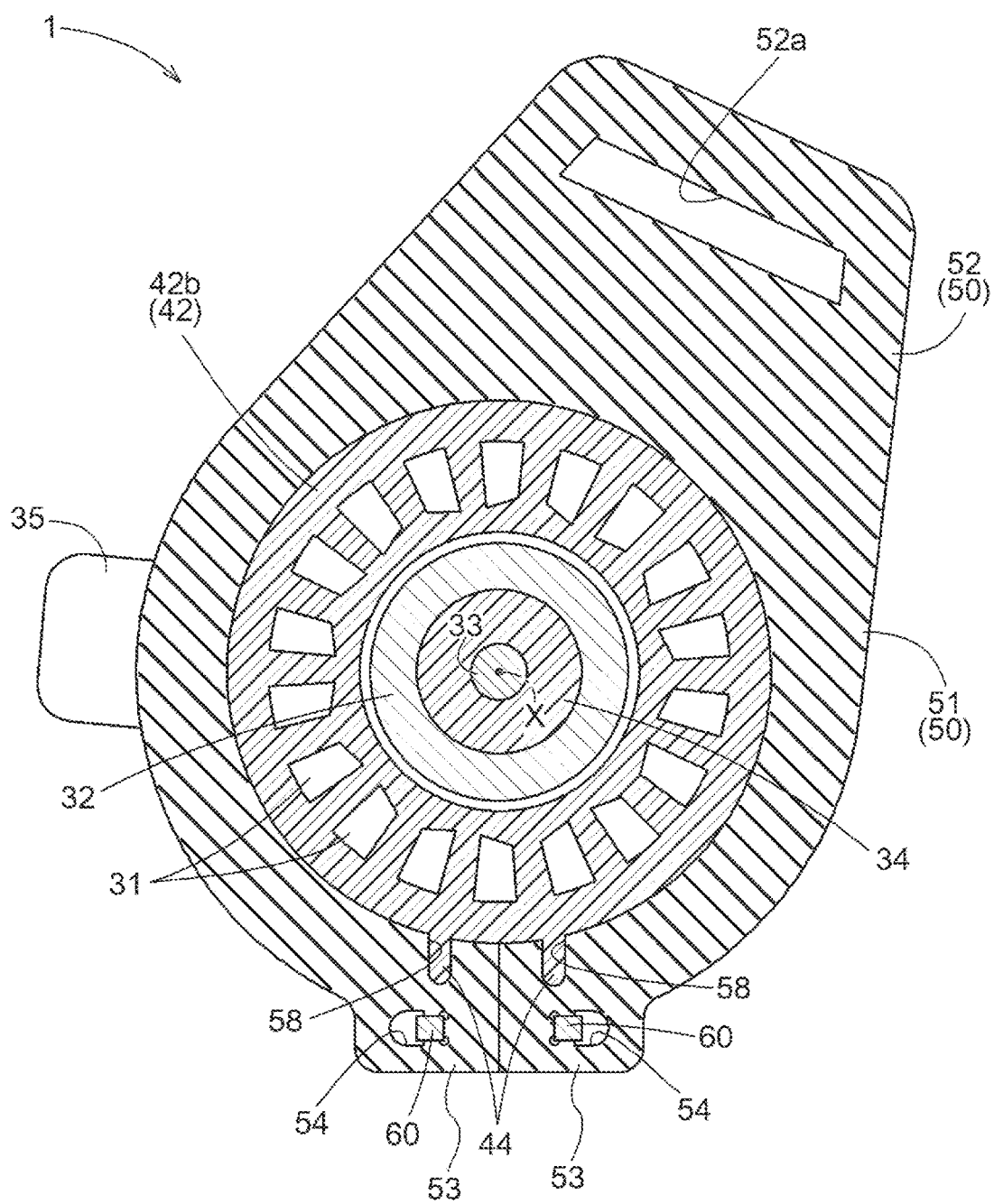
FIG. 4 is a sectional plan view of the electric pump.

The elastic member 50 is formed in an annular shape as illustrated in FIG. 3, and is arranged in such a way as to be along an outer periphery (the cylindrical portion 42b) of the pump body 40 (refer to FIG. 1 and FIG. 4). In the present embodiment, the elastic member 50 is arranged at the outer periphery of the motor body 42 in the pump body 40 (refer to FIG. 2 and FIG. 4). The elastic member 50 includes the annular portion 51 and an extension portion 52 connected to the annular portion 51, and the annular portion 51 is arranged at the cylindrical portion 42b of the motor body 42. The annular portion 51 is arranged in such a way as to closely contact with the cylindrical portion 42b of the pump body 40. The extension portion 52 extends from a part of an outer periphery of the annular portion 51, outward in the radial direction of the cylindrical portion 42b, and includes an opening 52a formed for attachment to an unillustrated bracket. Thereby, for example, the bracket is inserted into the opening 52b formed in the extension portion 52 connected to the annular portion 51, and thus, the electric pump 1 is held by the bracket. The elastic member 50 is made of a rubber material such as ethylene-propylene-diene monomer (EPDM) rubber. As illustrated in FIG. 3, an inner peripheral surface 51a included in the annular portion 51 and contacting against the motor body 42 is formed into a shape conforming to an outer peripheral shape of the cylindrical portion 42b of the motor body 42. The inner peripheral surface 51a may include a recess-shaped lightened portion that does not contact against the outer periphery of the cylindrical portion 42b of the motor body 42.

The elastic member 50 is split at a part of the peripheral direction in the annular portion 51. The splitting in the peripheral direction forms end portions 53 and 53 in the annular portion 51, and the end portions 53 and 53 face each other. The end portions 53 and 53 include a pair of penetration holes 54 and 54 extending along the direction of the axis X of the annular portion 51 (elastic member 50). Hereinafter, the end portions 53 and 53 are collectively referred to also as both end portions 53.

Figure 7:
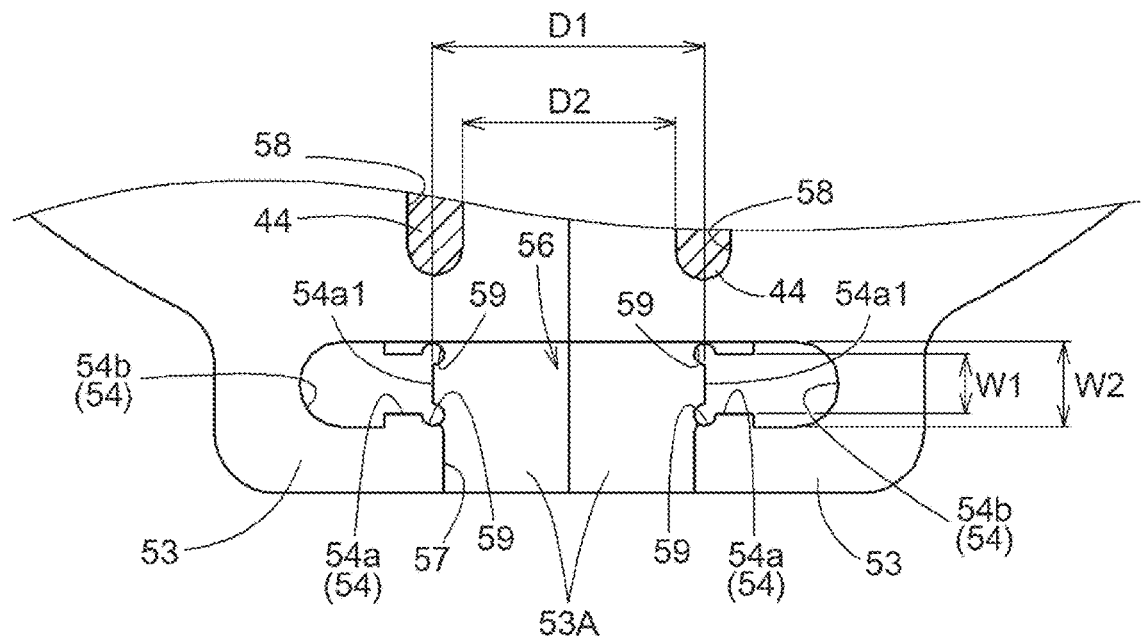
FIG. 7 is a sectional partial plan view of the electric pump.

As illustrated in FIG. 7, each of a pair of the penetration holes 54 and 54 is formed in an elongated hole that is elongated in the peripheral direction in a plan view. Each of a pair of the penetration holes 54 and 54 includes first and second hole portions 54a and 54b continuous with each other along the peripheral direction of the annular portion 51, the first hole portion 54a has a width W1 substantially the same as a thickness of the lock member 60, and the second hole portion 54b has a width W2 larger than the width W1 of the first hole portion 54a. The first hole portions 54a and 54a in a pair of the penetration holes 54 and 54 face each other in the peripheral direction of the annular portion 51. The width W1 of the first hole portion 54a substantially the same as the thickness of the lock member 60 enables the lock member 60 to be stably held by the first hole portion 54a. The width W2 of the second hole portion 54b larger than the width W1 of the first hole portion 54a enables the lock member 60 to be easily inserted into a pair of the penetration holes 54 and 54.

Both end portions 53 in the annular portion 51 are formed to protrude outward in the radial direction of the cylindrical portion 42b of the pump body 40, and thus, for example, forming the wide penetration holes 54 and 54 in both end portions 53 enables the lock member 60 to be easily inserted into the penetration holes 54 and 54.

The lock member 60 is inserted into a pair of the penetration holes 54 and 54 so that the inner surface 51a of the annular portion 51 of the elastic member 50 comes into close contact with the cylindrical portion 42b of the motor body 42 of the pump body 40, and the annular portion 51 comes into close contact with the cylindrical portion 42b. In this manner, the annular portion 51 of the elastic member 50 comes into close contact with the cylindrical portion 42b of the pump body 40, and thereby, the pump body 40 in the electric pump 1 can be reliably held by the elastic member 50. As illustrated in FIG. 3, the lock member 60 has a U-shape constituted of a pair of holding portions 61 extending in the direction of the axis X and a connection portion 62 connecting a pair of the holding portions 61 to each other. In the present embodiment, the lock member 60 is formed into a shape of a flat plate. The lock member 60 can be produced by pressing a metal material or molding a hard resin or the like, for example. A pair of the holding portions 61 and 61 in the lock member 60 are inserted into a pair of the penetration holes 54 and 54.

Figure 5:
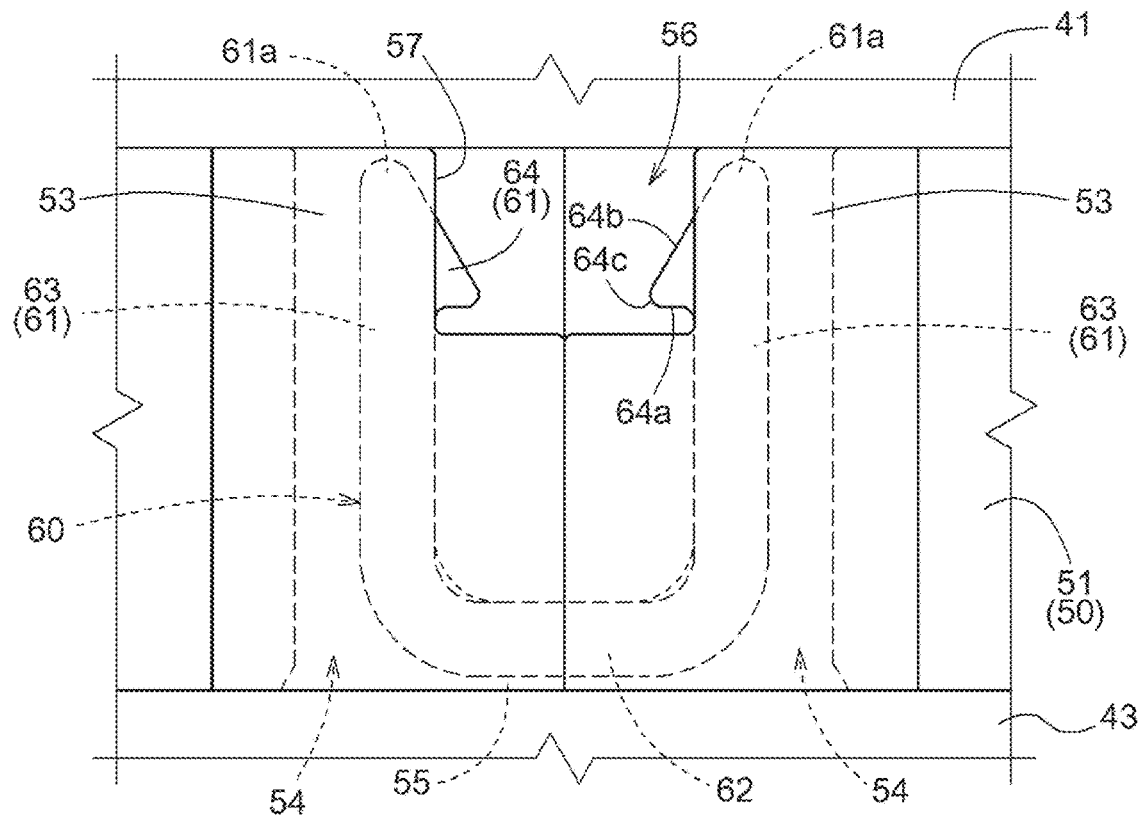
FIG. 5 is a partial front view of the electric pump.
Figure 6:
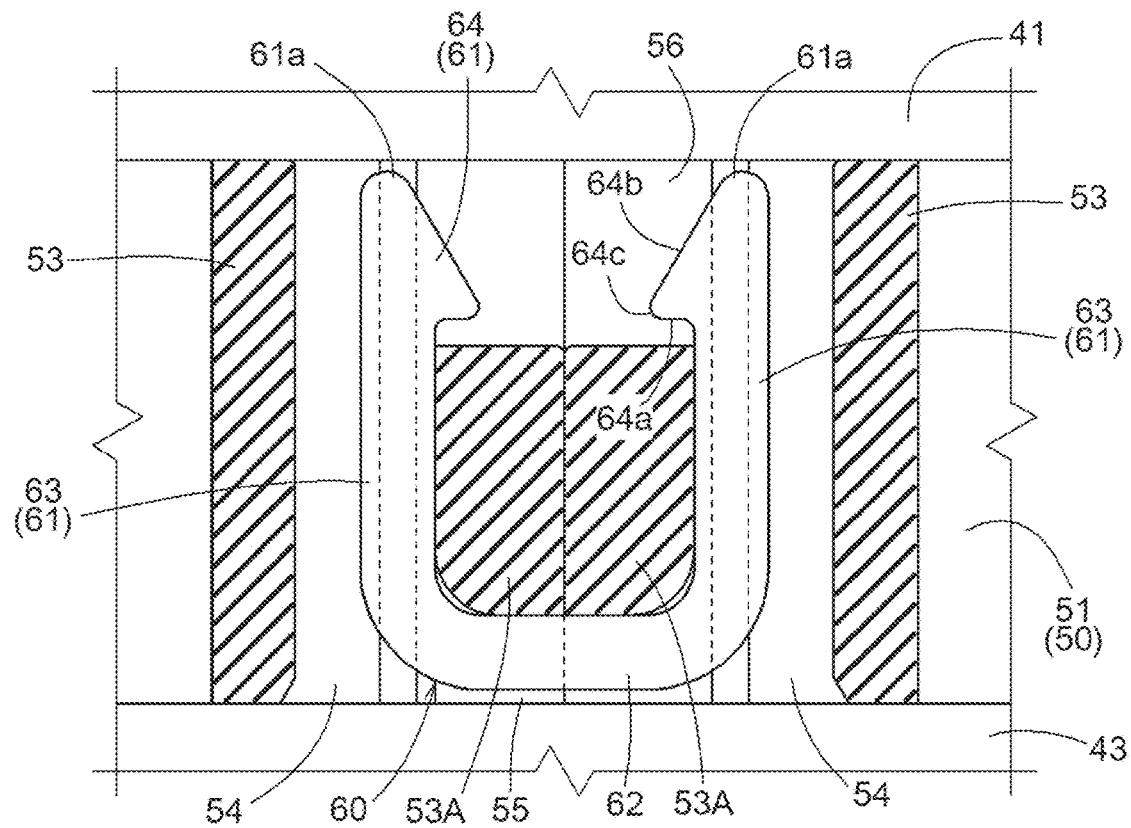
FIG. 6 is a sectional partial front view of the electric pump.

As illustrated in FIG. 5 and FIG. 6, the holding portion 61 of the lock member 60 includes a leg portion 63 and a slip-off prevention portion 64. The leg portion 63 extends in the direction of the axis X, and the slip-off prevention portion 64 is connected to a distal end side in the leg portion 63. The slip-off prevention portion 64 protrudes toward the opposing leg portion 63, and is formed in a triangular shape including a bottom surface 64a and an inclined surface 64b. The bottom surface 64a extends toward the opposing leg portion 63 from an intermediate part in the direction of the axis X in the leg portion 63. The inclined surface 64b is provided in such a way as to extend from an end portion 64c of the bottom surface 64a to an extension end 61a of the holding portion 61. The inclined surface 64b in the slip-off prevention portion 64 functions as a guide at the time of inserting the lock member 60 into the penetration holes 54. The holding portions 61 of the lock member 60 can be pushed into and inserted into the penetration holes 54 while the end portions 64c of the slip-off prevention portions 64 are made to contact against inner surfaces of the penetration holes 54. The lock member 60 is set in such a way that a distance between a pair of the leg portions 63 and 63 is equal to or smaller than a distance between a pair of the penetration holes 54 and 54.

The annular portion 51 includes a hole portion 55 that can accommodate the connection portion 62 of the lock member 60 and that is formed in areas 53A and 53A located on one end side (a side from which the holding portions 61 of the lock member 60 are inserted) in the direction of the axis X and located between a pair of the penetration holes 54 and 54. As illustrated in FIG. 3, FIG. 5, FIG. 6, and FIG. 7, the annular portion 51 includes a hole portion 56 that communicates with a pair of the penetration holes 54 and 54 and that is formed on an opposite end side (a side where the extension ends 61a of the holding portions 61 of the lock member 60 are located) in the direction of the axis X in the annular portion 51. A pair of the holding portions 61 and 61 of the lock member 60 are inserted into a pair of the penetration holes 54 and 54 in the direction of the axis X, until the end portions 64c of the slip-off prevention portions 64 become located within the hole portion 56. Thereby, the lock member 60 has been inserted into a pair of the penetration holes 54 and 54 in a state where the slip-off prevention portion 64 prevents the lock member 60 from slipping off from the penetration holes 54, and thus, the lock member 60 holds both end portions 53 of the annular portion 51 pulled in such a way as to become closer to each other. As a result, according to the electric pump 1, the annular portion 51 of the elastic member 50 is attached to the pump body 40 to be thereby brought into a state of closely contacting with the pump body 40, and thus, can stably holds the pump body 40. In this state, the extension ends 61a and 61a of the lock member 60 do not protrude from the hole portion 56 in the direction of the axis X.

A lock member for holding the annular portion 51 at the outer periphery of the pump body 40 is needed in order that the annular portion 51 including the split part in the peripheral direction is attached to the outer periphery of the pump body 40. Here, arranging the lock member along the radial direction of the annular portion 51 needs measures such as a configuration where fastening portions protrude outward in the radial direction of the annular portion 51, and a configuration where the lock member is constituted by two members, for example, a bolt and a nut, and thus, the electric pump 1 is increased in size. Meanwhile, as in the present embodiment, a pair of the penetration holes 54 and 54 along the direction of the axis X are provided in the annular portion 51, and the lock member 60 is inserted into a pair of the penetration holes 54 and 54 so that the lock member 60 does not largely protrude in the radial direction because of being inserted along the direction of the axis X, even when the lock member 60 is increased in size for making the annular portion 51 stably hold the pump body 40. In other words, the annular portion 51 does not need to be provided with the fastening portions protruding outward in the radial direction, and can be configured compactly. As a result, the electric pump 1 held by the elastic member 50 has improved mountability to a vehicle or the like.

Further, according to the present embodiment, the lock member 60 has the simple U-shaped configuration constituted of a pair of the holding portions 61 and 61 and the connection portion 62 that connects a pair of the holding portions 61 and 61 to each other, and thus, the lock member 60 can be easily manufactured. Since a pair of the holding portions 61 and 61 in the lock member 60 extend in the direction of the axis X, a pair of the holding portions 61 and 61 can be easily inserted into a pair of the penetration holes 54 and 54 of the annular portion 51. Thereby, the elastic member 50 in the electric pump 1 has more improved attachability.

In order for the lock member 60 to stably hold the annular portion 51 at the pump body 40, a pair of the holding portions 61 and 61 are preferably inserted into a pair of the penetration holes 54 and 54 in the direction of the axis X, over a length equal to or larger than a half length of the elastic member 50 along the direction of the axis X, for example. However, since a pair of the holding portions 61 and 61 of the lock member 60 are inserted into a pair of the penetration holes 54 and 54, a state of insertion of a pair of the holding portions 61 and 61 into a pair of the penetration holes 54 and 54 cannot be confirmed from outside the annular portion 51 unless a length of the holding portion 61 is longer than a length of the elastic member 50 along the direction of the axis X.

In view of it, according to the present embodiment, as illustrated in FIG. 1, FIG. 3, FIG. 5, and FIG. 7, the annular portion 51 in the elastic member 50 includes a notch portion 57 formed inward in the radial direction in an area that is included in the areas 53A and 53A between a pair of the penetration holes 54 and 54 in the peripheral direction and that ranges along the direction of the axis X from a side of the extension ends 61a of the holding portions 61 to an intermediate location, and thus, the annular portion 51 is configured in such a way that a part of the lock member 60 is visible from an outside via the notch portion 57. Specifically, the notch portion 57 and the hole portion 56 communicate with each other, and the slip-off prevention portions 64 of the lock member 60 is visible from an outside through the notch portion 57. The notch portion 57 is formed in the annular portion 51 from a side of the extension ends 61a of the holding portions 61 along the direction of the axis X in such a way as to have a length equal to or smaller than a half length of the elastic member 50 in the direction of the axis X, for example. With the present configuration, the notch portion 57 enables easy confirmation of whether positions of a pair of the holding portions 61 and 61 of the lock member 60 are appropriate, and the lock member 60 can be reliably arranged and attached at an appropriate position in the annular portion 51 by adjusting a position of the lock member 60, based on a result of the confirmation. In the present embodiment, the notch portion 57 is set in such a way as to range over an area equal to or smaller than a half area of the annular portion 51 in the direction of the axis X.

In the peripheral direction of continuing to a pair of the penetration holes 54 and 54, the lock member 60 inserted into a pair of the penetration holes 54 and 54 elastically deforms the annular portion 51 in a direction in which both end portions 53 become closer to each other. However, the elastic deformation less occurs by the lock member 60 at parts in the annular portion 51 and on an inner peripheral side closer to the pump body 40 than a pair of the penetration holes 54 and 54, and the parts on the inner peripheral side receive the reaction force in a direction of separating in the annular portion 51 and are thereby caused to be in an opened state (a state where the parts on the inner peripheral side in the end portions 53 and 53 are separated from each other in the peripheral direction) in some cases. In view of it, in the present embodiment, as illustrated in FIG. 3, FIG. 4, and FIG. 7, the pump body 40 includes a pair of protrusions 44 and 44 protruding outward in the radial direction at positions that are on an outer peripheral surface 42ba of the cylindrical portion 42b of the motor body 42 and that face the end portions 53 and 53 of the elastic member 50. Each of a pair of the protrusions 44 and 44 is formed in a shape of a perpendicularly elongated rib along the direction of the rotational shaft 33. Meanwhile, the annular portion 51 includes a pair of recesses 58 that are on the inner peripheral surface 51a and with which a pair of the protrusions 44 and 44 engage.

As illustrated in FIG. 7, assuming that D1 is defined as a distance between a pair of the penetration holes 54 and 54 in the peripheral direction, and D2 is defined as a distance between a pair of the recesses 58 and 58 in the peripheral direction, the annular portion 51 is configured in such a way that the distance D2 is shorter than the distance D1. Thereby, in the annular portion 51, the reaction force in the direction in which the end portions 53 and 53 are separated from each other can be received by the protrusions 44 included in the motor body 42 and engaging with a pair of the recesses 58 and 58 on the inner peripheral surface 51a. As a result, the annular portion 51 can suppress the parts on an inner peripheral side of a pair of the penetration holes 54 and 54 from being opened. A pair of the recesses 58 and 58 of the annular portion 51 are caused to engage with a pair of the protrusions 44 and 44 of the motor body 42, and thus, the annular portion 51 (elastic member 50) is easily positioned relative to the pump body 40, and the annular portion 51 is temporarily locked to the pump body 40 so that the electric pump 1 allows the elastic member 50 to be quickly arranged on the outer periphery of the pump body 40.

The lock member 60 to be inserted into a pair of the penetration holes 54 and 54 can be produced by pressing a metal material or molding a hard resin, for example, as described above. In this case, burrs occur on end portions of the lock member 60 on a side of a sag surface in some cases. Existence of the burrs on the end portions of the lock member 60 hinders the lock member 60 from being inserted into a pair of the penetration holes 54 and 54. There is a possibility that the burrs cause cracks in the penetration holes 54 and 54, thus leading to rupture of the annular portion 51. For this reason, in order to prevent the burrs from coming into contact against the penetration holes 54 and 54, processing of removing the burrs is needed in producing the lock member 60. However, removing the burrs needs a work step. In view of it, in the present embodiment, as illustrated in FIG. 7, each of a pair of the penetration holes 54 and 54 in the annular portion 51 includes escape portions 59 that are located on a side closer to the opposite penetration hole 54 in the peripheral direction of the annular portion 51 and that expand inward and outward in the radial direction. Thereby, even when the burrs exist on the lock member 60, the escape portions 59 formed in a pair of the penetration holes 54 and 54 allow the burrs on the lock member 60, and can prevent the burrs from coming into contact against the penetration holes 54 and 54. As a result, processing of removing the burrs is not needed, and thus, the lock member 60 can be easily produced. In the example illustrated in FIG. 7, the two circular escape portions 59 are provided in each of a pair of the penetration holes 54 and 54, and the two escape portions 59 are arranged on a radial-direction inner side and on a radial-direction outer side in the penetration hole 54, and expand as far as a position closer to the opposite penetration hole 54 than a part 54a1 that is included in the first hole portion 54a and against which the lock member 60 comes into contact. The escape portions 59 are formed both on a radial-direction inner side and on a radial-direction outer side in a pair of the penetration holes 54 and 54, and thus, the pressed lock member 60 can be attached without distinguishing whether the sag surface is on a front side or on a back side.

The following describes a method for attaching the elastic member 50 to the motor body 42 (pump body 40). First, the end portions 53 and 53 of the annular portion 51 of the elastic member 50 are opened, and thus, the annular portion 51 is arranged from a lateral side of the pump body 40 in such a way as to be along the cylindrical portion 42b of the motor body 42, and a pair of the recesses 58 are caused to engage with a pair of the protrusions 44 of the motor body 42. Thereby, both end portions 53 of the annular portion 51 of the elastic member 50 are positioned at predetermined locations on the outer periphery of the motor body 42.

Next, the lock members 60 are inserted into a pair of the penetration holes 54 provided at both end portions 53 of the annular portion 51 of the elastic member 50. The lock member 60 is inserted into a pair of the penetration holes 54 until the slip-off prevention portions 64 becomes located in the hole portion 56. The lock member 60 in an initial state cannot be inserted into the penetration holes 54 in the elastic member 50, and the lock member 60 in a state where a pair of the holding portions 61 and 61 are elastically deformed in a direction of separating from each other is inserted into the penetration holes 54 and 54. After the slip-off prevention portions 64 pass through the penetration holes 54, the restoring force causes a pair of the leg portions 63 and 63 to contact against the areas 53A and 53A between a pair of the penetration holes 54 and 54, and thereby, the annular portion 51 is held in a state where both end portions 53 are close to each other.

Second Embodiment

Figure 8:
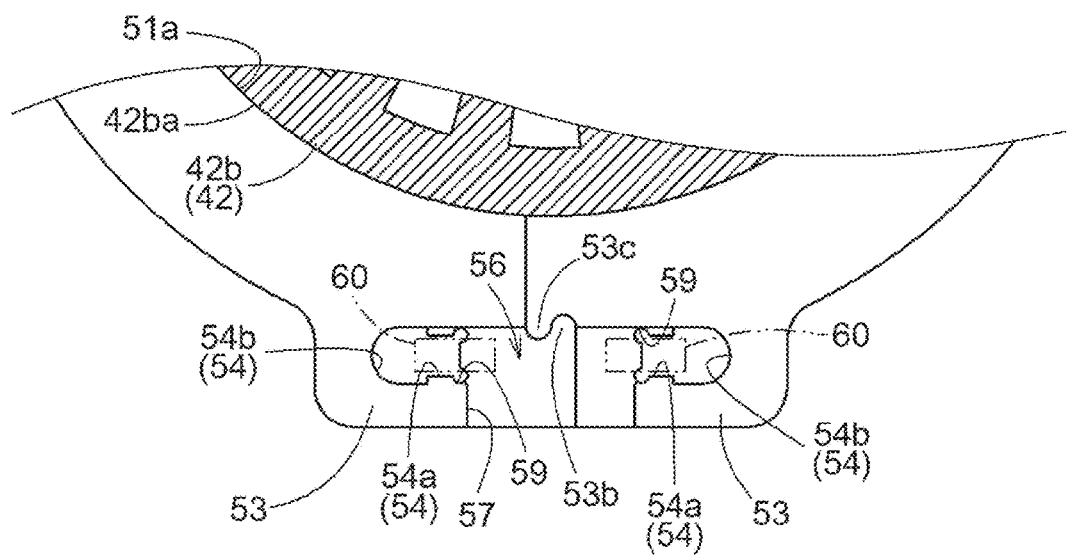
FIG. 8 is a sectional partial plan view of an electric pump according to a second embodiment.

As illustrated in FIG. 8, the elastic member 50 may be configured in such a way that the end portions 53 and 53 in the annular portion 51 can be locked by each other in the peripheral direction. Specifically, one of the end portions 53 includes a lock portion 53b, the other of the end portions 53 includes a lock portion 53c, the lock portion 53b and the lock portion 53c are formed to have mutually locked uneven shapes in a plan view, and the lock portion 53b and the lock portion 53c are configured to overlap with each other in the radial direction of the annular portion 51. In the second embodiment, the motor body 42 is not provided with a pair of the protrusions 44, and the annular portion 51 is not provided with a pair of the recesses 58. The other configurations are similar to those in the first embodiment.

According to the second embodiment, the annular portion 51 is configured in such a way that the lock portions 53b and 53c enable the end portions 53 and 53 to be locked by each other in the peripheral direction, and thus, even when the reaction force acts, in the mutually separating direction of the end portions 53 and 53, on an area on an inner peripheral side of a pair of the penetration holes 54 and 54 in the annular portion 51, the annular portion 51 can suppress the part on an inner peripheral side of a pair of the penetration holes 54 and 54 from being opened. The end portions 53 and 53 of the annular portion 51 in the elastic member 50 are locked by each other in the peripheral direction, and thus, the annular portion 51 can be temporarily locked to the pump body 40. Thereby, the electric pump 1 allows the elastic member 50 to be quickly arranged at the outer periphery of the pump body 40. A configuration in which the end portions 53 and 53 of the annular portion 51 can be locked by each other is not limited to the example illustrated in FIG. 8, and may be any of other configurations as long as the end portions 53 and 53 overlap with each other in the radial direction of the annular portion 51.

Figure 9:
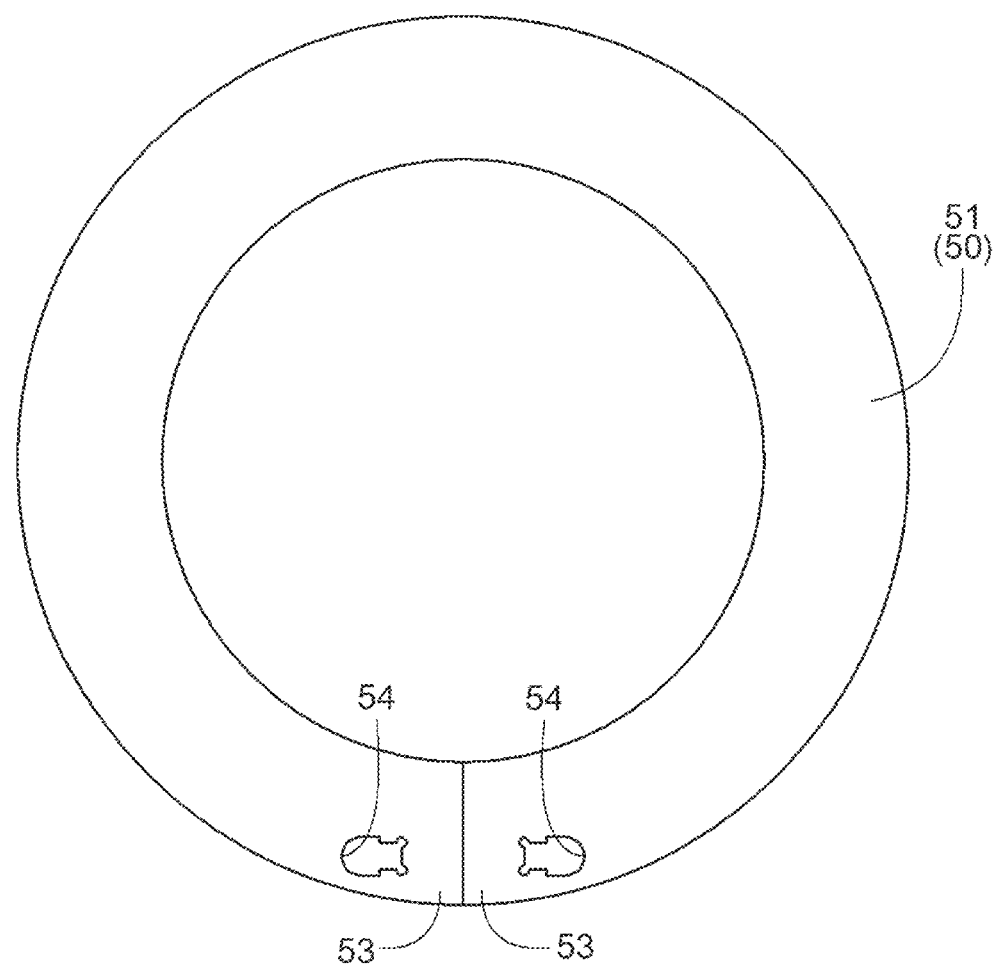
FIG. 9 is a plan view of an elastic member in another configuration.

OTHER EMBODIMENTS (1) As illustrated in FIG. 9, the annular portion 51 of the elastic member 50 may be formed entirely in a circular-ring shape in such a way that both end portions 53 do not protrude outward in the radial direction, and has the same radial-direction thickness as that of the other parts in the elastic member 50. With the present configuration, the elastic member 50 becomes more compact than in the above-described embodiment, and for this reason, the electric pump 1 has the more improved mountability. In the example illustrated in FIG. 9, the elastic member 50 is constituted by only the annular portion 51. In a modified example of the example illustrated in FIG. 9, the elastic member 50 may have the extension portion 52.

(2) In the example represented in the first embodiment, a pair of the projections 44 and 44 are provided on the outer peripheral surface 42ba of the pump body 40, and a pair of the recesses 58 and 58 are provided on the inner peripheral surface 51a of the annular portion 51 of the elastic member 50. However, recesses may be provided on the outer peripheral surface 42ba of the pump body 40, and projections engaging with the recesses may be provided on the inner peripheral surface 51a of the annular portion 51. In the first embodiment, the electric pump 1 may be configured without providing the recesses 58 on the inner peripheral surface 51a of the annular portion 51 and without providing the protrusions 44 on the outer peripheral surface 42ba of the pump body 40.

(3) In the example represented in the above-described embodiment, the lock member 60 inserted into a pair of the penetration holes 54 and 54 is configured as the single U-shaped member. However, the lock member 60 may be configured by combining a plurality of members. In the example represented in the above-described embodiment, a pair of the recesses 58 and 58 and a pair of the protrusions 44 and 44 are provided. However, each of the number of the recesses 58 and the number of the protrusions 44 may be equal to or larger than three.

(4) In the example represented in the above-described embodiment, the annular portion 51 of the elastic member 50 includes the hole portion 55 in which the connection portion 62 of the lock member 60 is accommodated, and includes the hole portion 56 in which the slip-off prevention portions 64 of the lock member 60 are accommodated. However, the annular portion 51 may be configured without providing one or both of the hole portion 55 and the hole portion 56. The electric pump 1 may be configured without providing the notch portion 57 in the annular portion 51.

INDUSTRIAL APPLICABILITY

The present disclosure can be widely applied to electric pumps each including an elastic member that holds a pump body.

REFERENCE SIGNS LIST

1: Electric pump
40: Pump body
42: Motor body
42a, 42c: Flange
42b: Cylindrical portion
42ba: Outer peripheral surface
44: Protrusion
50: Elastic member
51: Annular portion
51a: Inner peripheral surface
52: Extension portion
52a: Opening
53: End portion
53b, 53c: Lock portion
54: Penetration hole
57: Notch portion
58: Recess
59: Escape portion
60: Lock member
61: Holding portion
61a: Extension end
62: Connection portion
63: Leg portion
64: Slip-off prevention portion
D1: Distance between pair of penetration holes
D2: Distance between pair of protrusions
X: Axis

The invention claimed is:

1. An electric pump comprising:
a pump body;
an annular elastic member to be arranged on an outer periphery of the pump body; and
a lock member to be attached to the elastic member, wherein
the elastic member is split as a part of a peripheral direction, and includes a pair of penetration holes along an axial direction of the elastic member, at both end portions that face each other by the splitting of the peripheral direction, and
the lock member is inserted into the pair of penetration holes at a position spaced apart from the outer periphery of the pump body in such a way that the elastic member closely contacts with the pump body and holds the pump body.

2. The electric pump according to claim 1, wherein
the lock member has a U-shape that includes a pair of holding portions extending in the axial direction and a connection portion connecting a pair of the holding portions to each other, and a pair of the holding portions are inserted into the pair of penetration holes.

3. The electric pump according to claim 2, wherein
the annular elastic member includes a notch portion formed inward in a radial direction in an area that is included in an area between the pair of penetration holes in the peripheral direction and that ranges along the axial direction from a side of an extension end of the holding portion to an intermediate location, and
a part of the lock member is visible from an outside via the notch portion.

4. The electric pump according to claim 1, wherein
the pump body includes a pair of protrusions protruding outward in a radial direction at positions that are on an outer peripheral surface of the pump body and that face the both end portions of the elastic member,
the elastic member includes a pair of recesses with which a pair of the protrusions engage, and
a distance between a pair of the recesses in the peripheral direction is shorter than a distance between a pair of the penetration holes in the peripheral direction.

5. The electric pump according to claim 1, wherein
each of a pair of the penetration holes includes an escape portion that is located on a side closer to the opposite penetration hole in the peripheral direction of the elastic member and that expands inward and outward in a radial direction.

6. The electric pump according to claim 1, wherein
the annular elastic member is configured in such a way that the both end portions can be locked by each other in the peripheral direction.

7. The electric pump according to claim 1, wherein
the elastic member includes an annular portion including the both end portions, and an extension portion connected to the annular portion,
the pump body includes a cylindrical portion with which the annular portion closely contacts, and
the extension portion extends from a part of an outer periphery of the annular portion, outward in a radial direction of the cylindrical portion, and an opening is formed in the extension portion.

8. The electric pump according to claim 1, wherein
the elastic member includes an annular portion including the both end portions,
the pump body includes a cylindrical portion with which the annular portion closely contacts, and
the annular portion is formed in such a way that the both end portions protrude outward in a radial direction of the cylindrical portion.

9. The electric pump according to claim 1, wherein
the elastic member includes an annular portion including the both end portions,
the pump body includes a cylindrical portion with which the annular portion closely contacts,
the cylindrical portion includes a pair of protrusions protruding outward in a radial direction at positions that are on an outer peripheral surface of the cylindrical portion and that face the both end portions of the annular portion, and
the annular portion includes a pair of recesses with which a pair of the protrusions engage, and is arranged in such a way as to be along the cylindrical portion of the pump body, and a pair of the recesses engage with a pair of the protrusions.

10. The electric pump according to claim 1, wherein
the elastic member includes an annular portion including the both end portions,
the pump body includes a cylindrical portion with which the annular portion closely contacts, and a pair of flanges that are provided at both end portions in the cylindrical portion in the axial direction of the annular portion, and
a pair of the flanges are provided in such a way as to be able to restrict movement of the annular portion in the axial direction.

* * * * *